United States Patent [19]

Schmidt

[11] 4,393,336
[45] Jul. 12, 1983

[54] REGULATION OF THE EHT VOLTAGE OF A CRT

[75] Inventor: Terrance C. Schmidt, Waterloo, Canada

[73] Assignee: Electrohome Limited, Kitchener, Canada

[21] Appl. No.: 250,262

[22] Filed: Apr. 2, 1981

[30] Foreign Application Priority Data

Dec. 23, 1980 [GB] United Kingdom ............... 8041238

[51] Int. Cl.³ ............................................. H01J 29/70
[52] U.S. Cl. .................................... 315/387; 315/411
[58] Field of Search ....................... 315/411, 387, 409;
358/243, 190; 331/62; 361/86; 318/650

[56] References Cited

U.S. PATENT DOCUMENTS 3,959,689  5/1976  Ikoma ................................. 315/387
4,058,754 11/1977  Ohnishi et al. ...................... 315/411
4,090,111  5/1978  Suzuki ................................ 315/411
4,233,635 11/1980  Suzuki ................................ 315/411

Primary Examiner—Maynard R. Wilbur
Assistant Examiner—K. R. Kaiser

[57] ABSTRACT

The frequency of operation of a tuned flyback type transformer is controlled by a voltage controlled oscillator whose output frequency varies with EHT in such a way that EHT tends to stay constant despite beam current or input voltage variations.

1 Claim, 1 Drawing Figure

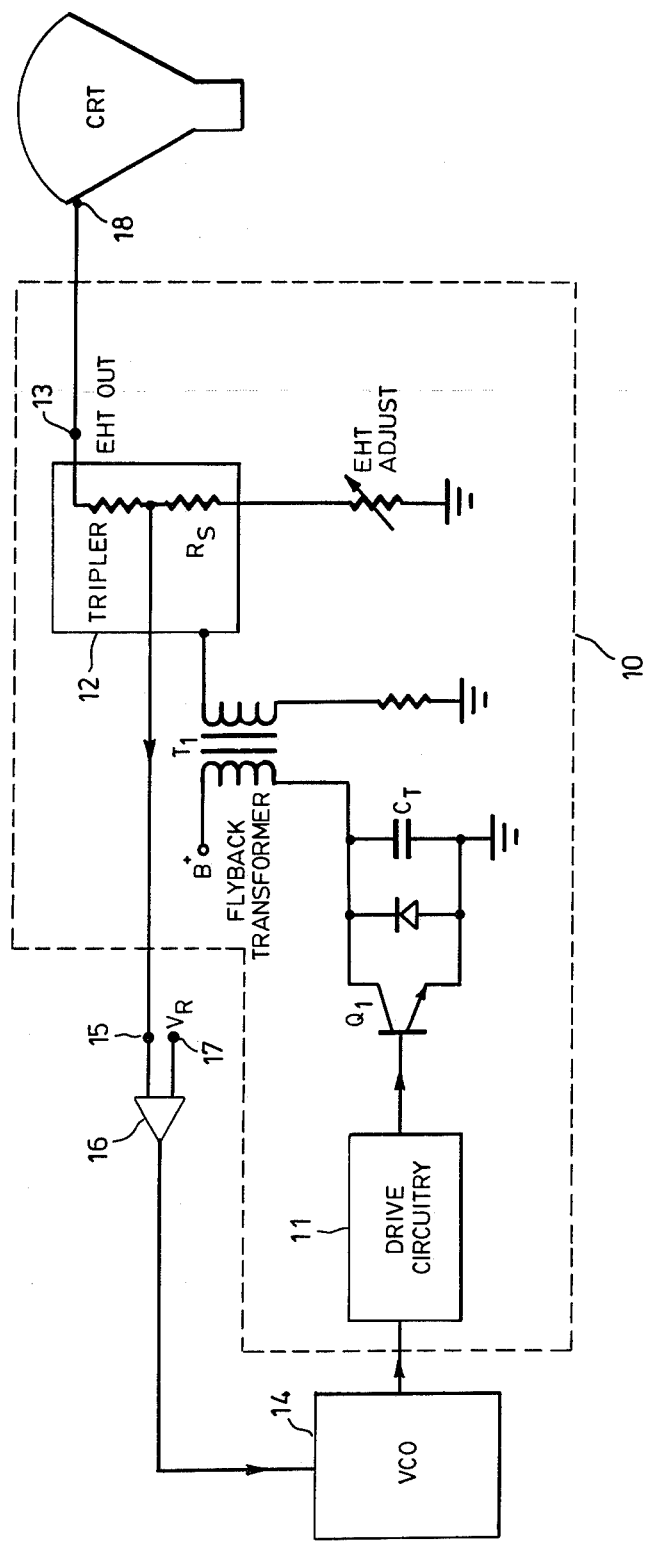

REGULATION OF THE EHT VOLTAGE OF A CRT

BACKGROUND OF THE INVENTION

This invention relates to systems for regulating the high voltage (EHT) applied to the anode of a cathode ray tube. The invention is particularly applicable to X-Y monitors and data/graphics video projectors, for example, where the frequencies of the deflection signals are not constant and, hence, are not used to derive the EHT. However, the invention also may be used in raster-scan systems, e.g., conventional television receivers, as long as the conventional horizontal deflection circuitry thereof, which operates at a constant frequency, is not used for deriving the EHT.

SUMMARY OF THE INVENTION

An aspect of the invention is as follows:

In combination with a cathode ray tube having an anode; means for deriving and supplying EHT to said anode other than via horizontal deflection circuitry for said cathode ray tube, said deriving and supplying means including a flyback transformer producing flyback pulses; a voltage controlled oscillator; means for deriving an error signal indicative of a change in EHT both above and below a predetermined magnitude; means supplying said error signal to said voltage controlled oscillator to decrease the frequency of the output signal thereof in response to a decrease in EHT and to increase the frequency of the output signal thereof in response to an increase in EHT; and means utilizing said output signal to control the operation of said flyback transformer in such a way that the magnitude of said flyback pulses are increased in response to a decrease in EHT and decreased in response to an increase in EHT.

BRIEF DESCRIPTION OF THE DRAWING

This invention will become more apparent from the following detailed description, taken in conjunction with the appended drawing, which illustrates one circuit embodying the instant invention.

DETAILED DESCRIPTION OF THE INVENTION INCLUDING THE PREFERRED EMBODIMENT

Referring to the drawing, the circuitry shown within dotted line 10 is constituted by the same components, except for the absence of the horizontal deflection coil, as are employed in a conventional horizontal deflection circuit, but the circuitry shown within dotted line 10 is not used to provide horizontal deflection current. T1 is a tuned flyback transformer, e.g., third and fifth harmonic tuned, resonating with a tuning capacitor $C_T$. A power switching transistor Q1 is connected in circuit with the primary winding of flyback transformer T1, and the base of transistor Q1 is driven by a conventional drive circuit 11. The output of the tertiary winding of flyback transformer T1 is supplied to a conventional voltage doubler or tripler 12 from which the EHT output voltage is derived at output terminal 13 and supplied to the anode 18 of a CRT.

Unlike conventional horizontal deflection circuitry, however, where the input to drive circuit 11 is at a constant frequency (the horizontal deflection frequency), in the instant invention a voltage controlled oscillator (VCO) 14 is connected to drive circuit 11. The frequency of the output signal of VCO 14 varies dependent on the magnitude of the EHT and is used to keep the EHT constant. VCO 14 may be a stable "555" timer operating as an astable multivibrator. Thus, by means of a voltage divider, which includes a resistor $R_s$, a voltage which is proportional to and varies up and down in accordance with the EHT voltage is applied to one input terminal 15 of a voltage comparator 16. A reference voltage $V_R$ derivable from any suitable source is applied to the other input terminal 17 of comparator 16. The output of comparator 16 is an error signal which controls the frequency of the output signal of VCO 14 and this, in turn, regulates the EHT. Thus, when there is a drop in EHT, as would occur with an increase in CRT beam current, the error signal from comparator 16 shifts the frequency of the output signal of VCO 14 lower allowing a longer current ramp time, higher peak primary current and greater energy to be stored in the core of flyback transformer T1. Thus when transistor Q1 is turned off, the peak voltage will have been increased because the flyback time, being dependent on the magnitude of the capacitance of tuning capacitor $C_T$ and of the inductance of the primary winding of flyback transformer T1, does not change. In this way the EHT will be increased. Likewise, should the EHT increase beyond its desired level, as would occur with a decrease in CRT beam current, the output signal frequency of VCO 14 will increase resulting in a shorter current ramp time, a lower peak voltage when transistor Q1 is turned off and a reduction in EHT. In the foregoing manner EHT is kept constant at both low and high CRT beam currents.

It also should be noted that varying the B+ level to the horizontal output, which normally causes a change in EHT, will result in compensation of the type hereinbefore noted. Thus, EHT is independent of B+ variations and, therefore also is independent of line voltage variations.

While a preferred embodiment of this invention has been described, those skilled in the art will appreciate that changes and modifications may be made therein without departing from the spirit and scope of the invention as defined in the appended claim.

I claim:

1. In combination with a cathode ray tube having an anode; means for deriving and supplying EHT to said anode other than via horizontal deflection circuitry that supplies deflection current to the horizontal deflection coil for said cathode ray tube, said deriving and supplying means including a tuned flyback transformer producing flyback pulses; a voltage controlled oscillator; means for deriving an error signal indicative of a change in EHT both above and below a predetermined magnitude; means supplying said error signal to said voltage controlled oscillator to decrease the frequency of the output signal thereof in response to a decrease in EHT and to increase the frequency of the output signal thereof in response to an increase in EHT; and means utilizing said output signal to control the operation of said flyback transformer in such a way that the magnitude of said flyback pulses are increased in response to a decrease in EHT and decreased in response to an increase in EHT.

* * * * *